US012586974B2

(12) United States Patent
Nakagawa et al.

(10) Patent No.: US 12,586,974 B2
(45) Date of Patent: Mar. 24, 2026

(54) Raman AMPLIFIER, Raman AMPLIFICATION METHOD, AND Raman AMPLIFICATION SYSTEM

(71) Applicant: FUJITSU LIMITED, Kawasaki (JP)

(72) Inventors: Goji Nakagawa, Sagamihara (JP); Teppei Ohata, Fukuoka (JP)

(73) Assignee: 1FINITY INC., Kawasaki (JP)

( * ) Notice: Subject to any disclaimer, the term of this patent is extended or adjusted under 35 U.S.C. 154(b) by 811 days.

(21) Appl. No.: 17/860,209

(22) Filed: Jul. 8, 2022

(65) Prior Publication Data

US 2023/0142798 A1 May 11, 2023

(30) Foreign Application Priority Data

Apr. 21, 2022 (JP) ................................. 2022-069820

(51) Int. Cl.
 *H01S 3/0933* (2006.01)
 *H01S 3/094* (2006.01)
 (Continued)

(52) U.S. Cl.
 CPC ...... *H01S 3/0933* (2013.01); *H01S 3/094003* (2013.01); *H01S 3/094046* (2013.01); *H01S 3/094096* (2013.01); *H01S 3/13013* (2019.08); *H01S 3/302* (2013.01); *H04B 10/2916* (2013.01); *H01S 3/09415* (2013.01)

(58) Field of Classification Search
 CPC ......... H01S 3/30–302; H01S 3/094096; H01S 3/13013; H01S 3/09415; H01S 2301/04; H01S 3/09403; H01S 3/0933; H01S 3/0915; H04B 10/2916
 See application file for complete search history.

(56) References Cited

U.S. PATENT DOCUMENTS 5,883,736 A * 3/1999 Oshima ............. H01S 3/094003
                                                                359/341.33
6,147,794 A * 11/2000 Stentz ..................... H01S 3/302
                                                                398/1
(Continued)

FOREIGN PATENT DOCUMENTS

DE     19910041 A1 * 8/2000   ......... H04B 10/2916
EP     1018666 A1 * 7/2000    ......... H01S 3/13013
(Continued)

OTHER PUBLICATIONS

Masahito Morimoto et al., "Co-Propagating Dual-Order Distributed Raman Amplifier Utilizing Incoherent Pumping" IEEE Photonics Technology Letters, vol. 29, No. 7, Apr. 1, 2017 (pp. 567-570).
(Continued)

*Primary Examiner* — Joshua King
(74) *Attorney, Agent, or Firm* — STAAS & HALSEY LLP

(57) ABSTRACT

A Raman amplifier includes a first light source that outputs a primary pumping light, which propagates in a same direction as a propagation direction of a signal light, to an optical transmission line for Raman amplification, a second light source that outputs a secondary pumping light, which pumps and amplifies the primary pumping light and propagates in the same direction as the propagation direction, to the optical transmission line, and a control unit that controls a gain for the signal light by adjusting power of the secondary pumping light.

9 Claims, 10 Drawing Sheets

\<EMBODIMENT\>

(51) Int. Cl.
    *H01S 3/0941*     (2006.01)
    *H01S 3/13*     (2006.01)
    *H01S 3/30*     (2006.01)
    *H04B 10/291*     (2013.01)

(56)     References Cited

U.S. PATENT DOCUMENTS

| | | | | |
|---|---|---|---|---|
| 6,163,636 A * | 12/2000 | Stentz | H01S 3/302 | 398/1 |
| 6,320,884 B1 * | 11/2001 | Kerfoot, III | H01S 3/302 | 385/27 |
| 6,344,922 B1 * | 2/2002 | Grubb | H04B 10/2916 | 398/92 |
| 6,618,195 B2 * | 9/2003 | Shieh | H01S 3/094061 | 359/341.33 |
| 6,624,927 B1 * | 9/2003 | Wong | H01S 3/302 | 359/334 |
| 6,624,928 B1 * | 9/2003 | Masum-Thomas | H01S 3/302 | 372/6 |
| 6,700,696 B2 * | 3/2004 | Dominic | H01S 3/302 | 359/341.32 |
| 6,775,057 B2 * | 8/2004 | Akasaka | H01S 3/094096 | 359/337.5 |
| 6,813,067 B1 * | 11/2004 | Birk | H01S 3/1022 | 359/334 |
| 6,819,479 B1 * | 11/2004 | Islam | H01S 3/06754 | 359/337 |
| 7,197,245 B1 * | 3/2007 | Islam | H04B 10/2916 | 398/160 |
| 7,508,575 B2 * | 3/2009 | Papernyi | H04B 10/291 | 359/341.32 |
| 7,848,013 B2 * | 12/2010 | Fella | H01S 3/302 | 359/334 |
| 2002/0145796 A1 * | 10/2002 | Kikuchi | H04B 10/291 | 359/341.33 |
| 2003/0063850 A1 * | 4/2003 | Muro | H01S 3/13013 | 359/341.1 |
| 2003/0133179 A1 * | 7/2003 | Islam | H01S 3/302 | 359/334 |
| 2003/0137720 A1 * | 7/2003 | Onaka | H01S 3/13013 | 359/334 |
| 2004/0091263 A1 * | 5/2004 | Sakamoto | H04B 10/294 | 398/45 |
| 2004/0190120 A1 * | 9/2004 | Torii | H01S 3/302 | 359/334 |
| 2005/0237601 A1 | 10/2005 | Nakaji | | |
| 2009/0190206 A1 * | 7/2009 | Onaka | H01S 3/10015 | 359/334 |
| 2015/0229098 A1 * | 8/2015 | Tsuzuki | H04B 10/564 | 359/334 |
| 2018/0123311 A1 * | 5/2018 | Ogoshi | H01S 3/302 | |
| 2019/0089117 A1 | 3/2019 | Nakamura | | |
| 2020/0007238 A1 * | 1/2020 | Fu | H01S 3/1301 | |
| 2021/0111800 A1 * | 4/2021 | Nakata | H04B 10/2916 | |

FOREIGN PATENT DOCUMENTS

| | | | | |
|---|---|---|---|---|
| JP | 2002072262 A * | 3/2002 | | H04B 10/0777 |
| JP | 2004088376 A * | 3/2004 | | H04B 10/2916 |
| JP | 2004144815 A * | 5/2004 | | H04J 4/02216 |
| JP | 2004519702 A * | 7/2004 | | H04B 10/2942 |
| JP | 2005-309250 | 11/2005 | | |
| JP | 2016-212370 | 12/2016 | | |
| JP | 2020-129143 | 8/2020 | | |
| JP | 2021-63857 | 4/2021 | | |
| WO | 2014/068776 A1 | 5/2014 | | |
| WO | WO 2017/170008 A1 | 10/2017 | | |

OTHER PUBLICATIONS

Office Action issued Oct. 7, 2025 for Japanese Application No. 2022-069820.

* cited by examiner

SI TRANSMISSION SYSTEM

〈EMBODIMENT〉 STa RAMAN AMPLIFICATION SYSTEM

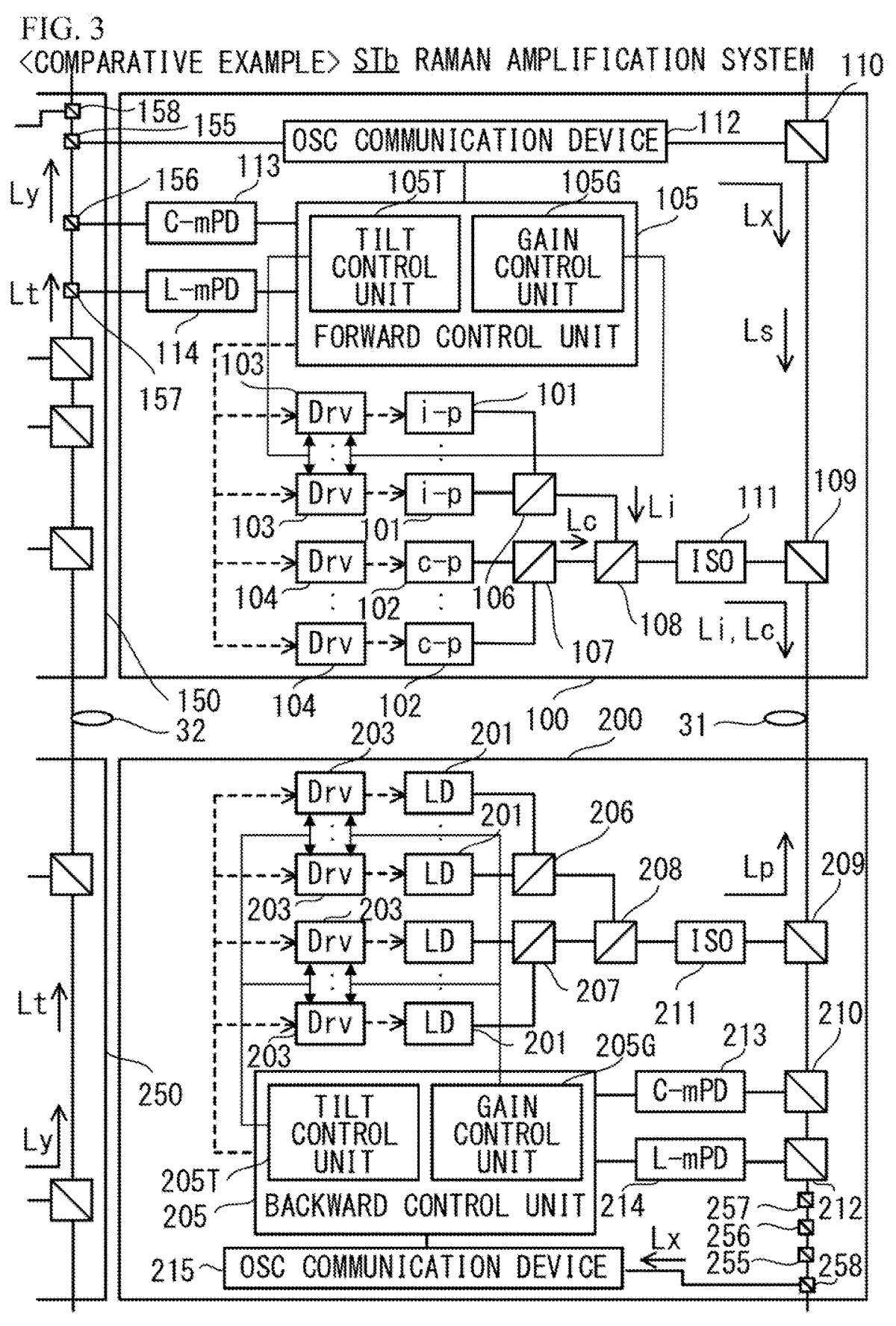

FIG. 3
<COMPARATIVE EXAMPLE> STb RAMAN AMPLIFICATION SYSTEM    110

OSC COMMUNICATION DEVICE    112

TILT CONTROL UNIT  105T     GAIN CONTROL UNIT  105G     105

FORWARD CONTROL UNIT

C-mPD  156  113
L-mPD  114
157

Drv  103  i-p  101
Drv  i-p
103  01
Drv  c-p
104  102  106
Drv  c-p

Ly
Lt
158  155

Lx
Ls

Li
Lc  107
111  ISO  109
108 Li, Lc 150  104  102  100  200
32  203  201  31

Drv  LD  201  206
Drv  LD
203  203
Drv  LD  208
Drv  LD  207

Lp  209
ISO  211
210

TILT CONTROL UNIT     GAIN CONTROL UNIT  205G     C-mPD  213
L-mPD  214
BACKWARD CONTROL UNIT 205T
205

215  OSC COMMUNICATION DEVICE

Lt
Ly
250

Lx
257  212
256
255  258

INITIAL STATE TRANSITION PROCESS

START

SET FIBER INPUT POWER, RATIO, AND TARGET GAIN    S11

OUTPUT PRIMARY/SECONDARY PUMPING LIGHTS AT MINIMUM POWER    S12

CALCULATE PUMPING RATIO OF PRIMARY PUMPING LIGHTS    S13

MAXIMIZE POWER OF PRIMARY PUMPING LIGHT BY PUMPING RATIO    S14

RAISE POWER OF SECONDARY PUMPING LIGHT BY SET RATIO    S15

END

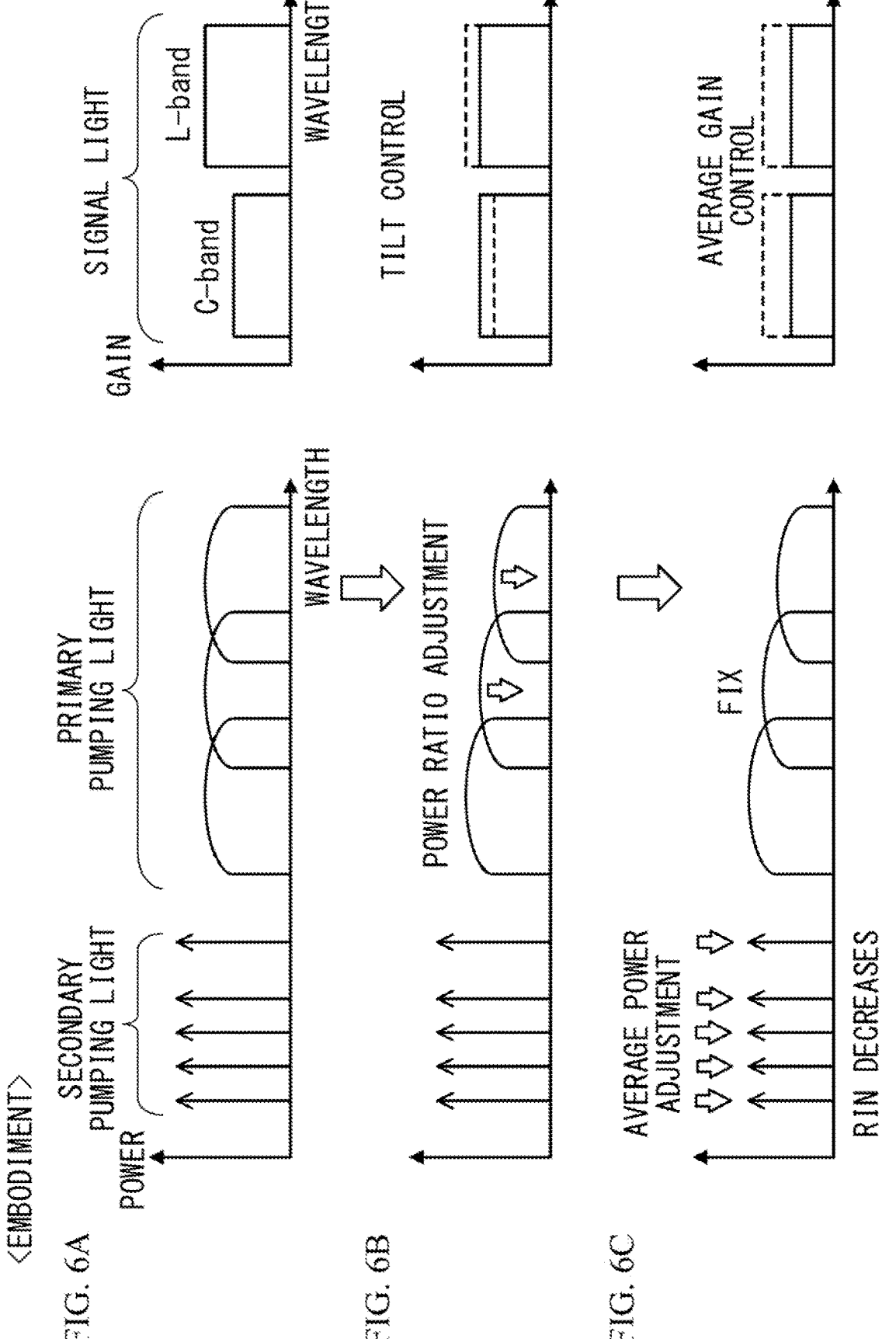

TILT CONTROL PROCESS

START

CALCULATE GAIN DIFFERENCE
BETWEEN C BAND AND L BAND — S31

ADJUST PUMPING POWER RATIO
OF PRIMARY PUMPING LIGHT — S32

END

GAIN CONTROL PROCESS

START

CALCULATE AVERAGE GAIN OF
ENTIRETY OF C BAND/L BAND — S41

ADJUST AVERAGE POWER OF
SECONDARY PUMPING LIGHTS — S42

END

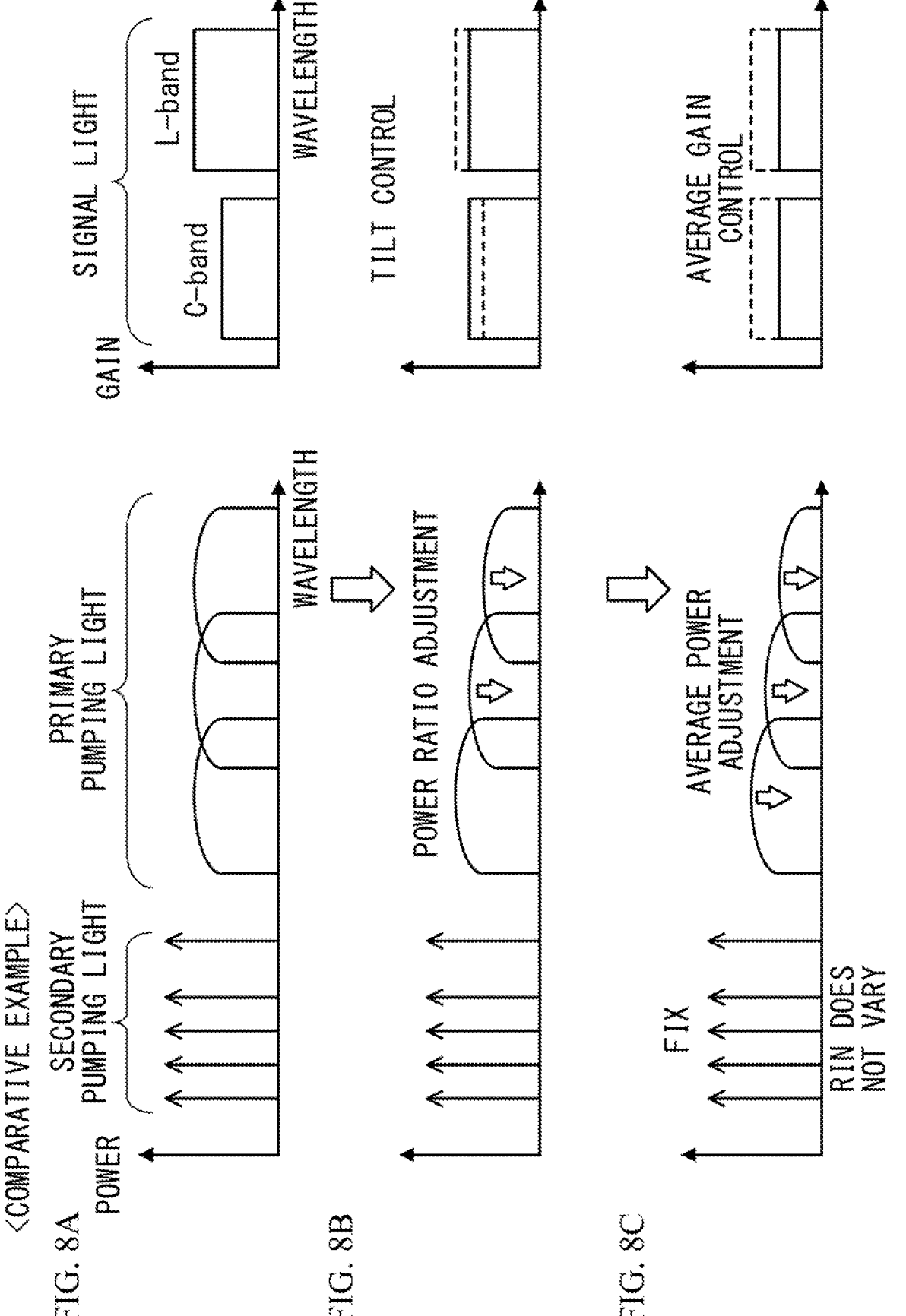

Raman AMPLIFIER, Raman AMPLIFICATION METHOD, AND Raman AMPLIFICATION SYSTEM

CROSS-REFERENCE TO RELATED APPLICATION

This application is based upon and claims the benefit of priority of the prior Japanese Patent Application No. 2022-069820, filed on Apr. 21, 2022, the entire contents of which are incorporated herein by reference.

FIELD

A certain aspect of embodiments described herein relates to a Raman amplifier, a Raman amplification method, and a Raman amplification system.

BACKGROUND

A technique for Raman amplification of signal light using pumping light is known as disclosed in, for example, Japanese Patent Application Publication No. 2005-309250. In addition, counter-propagating Raman amplification, in which pumping light is caused to enter a transmission line (more specifically, an optical fiber) for Raman amplification so as to propagate in a direction opposite to the propagation direction of the signal light, is known. Further, co-propagating Raman amplification, in which pumping light is caused to enter the transmission line for Raman amplification so as to propagate in the same direction as the propagation direction of the signal light, is also known. In addition, bidirectional-propagating Raman amplification, in which co-propagating Raman amplification is used simultaneously with counter-propagating Raman amplification, is also known as disclosed in, for example, Japanese Patent Application Publication No. 2020-129143.

In co-propagating Raman amplification, also known is a technique in which primary pumping light capable of optically amplifying the wavelength band of the signal light is optically amplified by secondary pumping light, and the signal light is optically amplified using the primary pumping light that has been optically amplified. In this technique, the primary pumping light and the secondary pumping light propagate through the transmission line in the same direction as the signal light as disclosed in, for example, Japanese Patent Application Publication No. 2021-063857.

SUMMARY

According to an aspect of the embodiments, there is provided a Raman amplifier including: a first light source that outputs a primary pumping light, which propagates in a same direction as a propagation direction of a signal light, to an optical transmission line for Raman amplification; a second light source that outputs a secondary pumping light, which pumps and amplifies the primary pumping light and propagates in the same direction as the propagation direction, to the optical transmission line; and a control unit that controls a gain for the signal light by adjusting power of the secondary pumping light.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 illustrates a Raman amplification system in accordance with a comparative example.

FIG. 6A is a diagram for describing an example of the initial state in accordance with the embodiment, FIG. 6B is a diagram for describing tilt control in accordance with the embodiment, and FIG. 6C is a diagram for describing gain control in accordance with the embodiment.

FIG. 8A is a diagram for describing an example of the initial state in accordance with the comparative example, FIG. 8B is a diagram for describing an example of tilt control in accordance with the comparative example, and FIG. 8C is a diagram for describing gain control in accordance with the comparative example.

DESCRIPTION OF EMBODIMENTS

In Raman amplification, the transmission line itself is used as the amplification medium, and therefore, the target gain is required to be changed according to the type of the transmission line. When the target gain is changed, a gain tilt occurs. When the tilt occurs, the quality of the signal light deteriorates. For example, the S/N ratio of the signal light in the wavelength band with a low gain deteriorates compared with the S/N ratio of the signal light in the wavelength band with a high gain. Thus, the quality of the signal light may vary depending on the wavelength band. The deterioration in the quality of the signal light causes deterioration in transmission performance (e.g., the transmission distance or the like) of the transmission device. Therefore, in Raman amplification, tilt control is performed to reduce the tilt.

In addition, in Raman amplification, the power of the pumping light introduced into the transmission line, which is the amplification medium, is decreased by a connection loss (so called, a lump loss) in the vicinity of the part where the pumping light is transmitted to the transmission line. When the power of the pumping light decreases, the gain for the signal light decreases, and the output of the signal light decreases. For this reason, in Raman amplification, gain control is performed to reduce a decrease in gain. As seen from the above, in Raman amplification, both the tilt control and the gain control are required.

In co-propagating Raman amplification, unlike counter-propagating Raman amplification, as the signal light and the pumping light propagate through the transmission line together over a long distance, a phenomenon in which the noise of the pumping light is gradually transferred as noise to the signal light occurs. This phenomenon is called relative intensity noise (RIN) transfer.

As described above, in co-propagating Raman amplification using primary pumping light and secondary pumping light, the primary pumping light is optically amplified by the secondary pumping light, and the signal light is optically amplified using the primary pumping light that has been optically amplified. However, when the primary pumping light is optically amplified by the secondary pumping light, the noise of the secondary pumping light is transferred to the primary pumping light. In addition, since the signal light is optically amplified using the primary pumping light, the noise transferred from the secondary pumping light to the primary pumping light is further transferred to the signal light. When the noise is transferred to the signal light, transmission errors increase, and the transmission performance deteriorates. Therefore, it is required to effectively control the gain for the signal light in co-propagating Raman amplification using the primary pumping light and the secondary pumping light.

Hereinafter, a description will be given of embodiments of the present disclosure with reference to the accompanying drawings.

Figure 1:
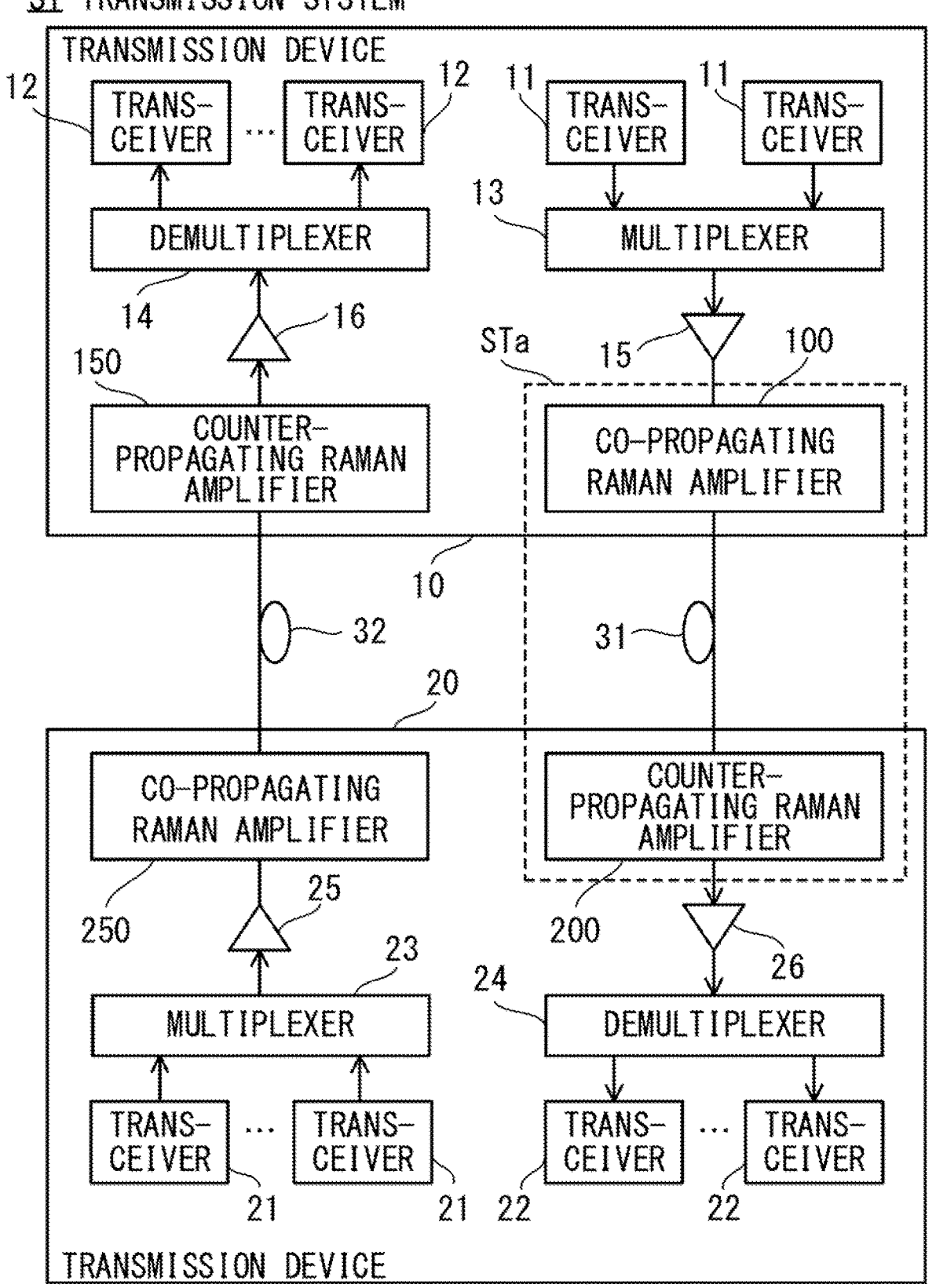
FIG. 1 illustrates a transmission system.

As illustrated in FIG. 1, a transmission system ST includes two transmission devices 10 and 20. The transmission devices 10 and 20 are connected via two optical transmission lines 31 and 32. The optical transmission lines 31 and 32 are examples of a transmission line. The optical transmission lines 31 and 32 include, for example, optical fibers. Note that the transmission line types of the optical transmission lines 31 and 32 are not particularly limited. For example, the optical transmission lines 31 and 32 may include single mode fibers (SMFs), or dispersion shifted fibers (DSFs). The optical transmission lines 31 and 32 may be included in the transmission system ST or are not necessarily included in the transmission system ST.

The transmission device 10 includes transceivers 11 and 12, a multiplexer 13, a demultiplexer 14, optical amplifiers 15 and 16, a co-propagating Raman amplifier 100, and a counter-propagating Raman amplifier 150. The co-propagating Raman amplifier 100 is an example of a Raman amplifier (more specifically, a first Raman amplifier). The transmission device 20 includes transceivers 21 and 22, a multiplexer 23, a demultiplexer 24, optical amplifiers 25 and 26, a counter-propagating Raman amplifier 200, and a co-propagating Raman amplifier 250. The counter-propagating Raman amplifier 200 is an example of a second Raman amplifier. The co-propagating Raman amplifier 100 is coupled to the counter-propagating Raman amplifier 200 via the optical transmission line 31. The co-propagating Raman amplifier 250 is coupled to the counter-propagating Raman amplifier 150 via the optical transmission line 32.

For example, a Raman amplification system STa can be constructed by the co-propagating Raman amplifier 100 and the counter-propagating Raman amplifier 200. The Raman amplification system STa may include or may not necessarily include the optical transmission line 31. The Raman amplification system STa can be also constructed by the co-propagating Raman amplifier 250 and the counter-propagating Raman amplifier 150. Such a Raman amplification system STa may include or may not necessarily include the optical transmission line 32.

The transceivers 11 transmit wavelength lights having different wavelengths, respectively. The transceivers 12 receive wavelength lights having different wavelengths, respectively. The multiplexer 13 multiplexes the wavelength lights having different wavelengths to produce a wavelength division multiplexing (WDM) signal light (hereinafter, simply referred to as a signal light). The demultiplexer 14 demultiplexes wavelength lights having the center wavelengths of a fixed constant wavelength interval from the signal light. The multiplexer 13 and the demultiplexer 14 include, for example, optical couplers.

Each of the optical amplifiers 15 and 16 amplifies the signal light. The optical amplifiers 15 and 16 include, for example, erbium doped fiber amplifiers (EDFAs). The optical amplifier 15 may be called, for example, a post-amplifier. The optical amplifier 16 may be called, for example, a pre-amplifier. The co-propagating Raman amplifier 100 outputs a pumping light to the optical transmission line 31 in the same direction as the propagation direction of the signal light. The pumping light enters the optical transmission line 31, which causes induced Raman scattering, and thereby, the signal light is Raman-amplified. The counter-propagating Raman amplifier 150 outputs a pumping light to the optical transmission line 32 in a direction opposite to the propagation direction of the signal light. The pumping light enters the optical transmission line 32, which causes induced Raman scattering, and thereby, the signal light is Raman-amplified.

The transceivers 21 and 22 basically have the same functions as the transceivers 11 and 12 described above, respectively, and the detailed description thereof is thus omitted. Similarly, the multiplexer 23 and the demultiplexer 24 basically have the same functions as the multiplexer 13 and the demultiplexer 14 described above, respectively, and the detailed description thereof is thus omitted. The optical amplifiers 25 and 26 basically have the same functions as the optical amplifiers 15 and 16 described above, respectively, and the detailed description thereof is thus omitted. The counter-propagating Raman amplifier 200 and the co-propagating Raman amplifier 250 basically have the same functions as the counter-propagating Raman amplifier 150 and the co-propagating Raman amplifier 100 described above, respectively, and the detailed description thereof is thus omitted.

Figure 2:
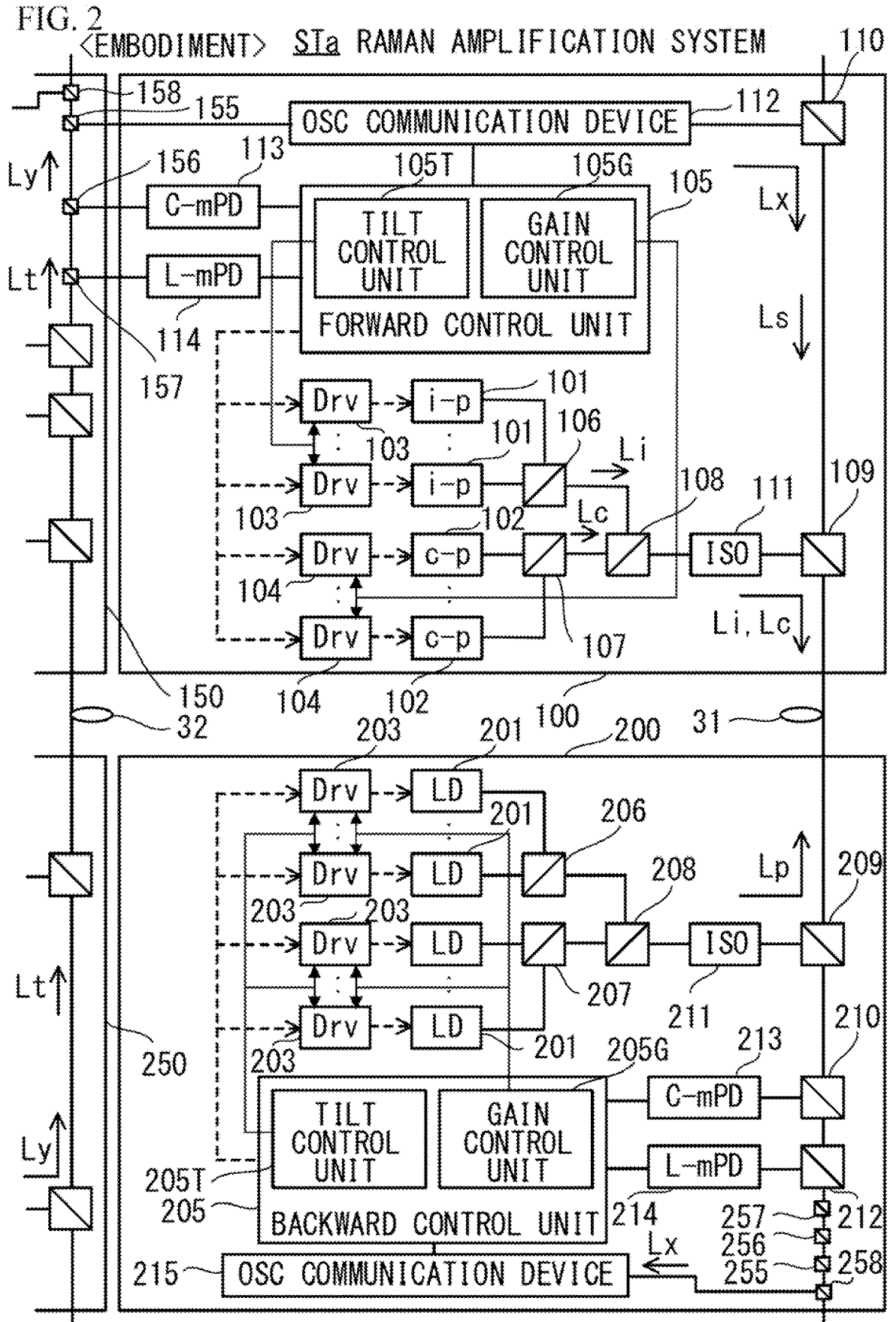
FIG. 2 illustrates a Raman amplification system in accordance with an embodiment.

With reference to FIG. 2, a description will be given of the details of the co-propagating Raman amplifier 100 and the counter-propagating Raman amplifier 200 of the Raman amplification system STa.

First, the co-propagating Raman amplifier 100 will be described. The co-propagating Raman amplifier 100 includes a plurality of i-pumps (abbreviated as i-p in FIG. 2) 101 and a plurality of c-pumps (abbreviated as c-p in FIG. 2) 102. The i-pump 101 is an example of a first light source. The c-pump 102 is an example of a second light source. Examples of the i-pump 101 and the c-pump 102 are disclosed in the following references.

REFERENCES

Japanese Patent No. 6774753 (Japanese Patent Application Publication No. 2016-212370)

"Co-Propagating Dual-Order Distributed Raman Amplifier Utilizing Incoherent Pumping", Masahito Morimoto et al., IEEE PHOTONICS TECHNOLOGY LETTERS, VOL. 29, NO. 7, Apr. 1, 2017

The co-propagating Raman amplifier 100 also includes forward first drivers (abbreviated as Drv in FIG. 2) 103, forward second drivers 104, and a forward control unit 105. The forward control unit 105 is an example of the control unit. The forward control unit 105 includes a tilt control unit 105T and a gain control unit 105G. Further, the co-propagating Raman amplifier 100 includes a plurality of optical filters 106, 107, 108, 109, and 110, and an opto-isolator (ISO in FIG. 2) 111. Further, the co-propagating Raman amplifier 100 includes an OSC communication device 112, a C-mPD 113, and an L-mPD 114.

The i-pumps 101 output primary pumping lights Li having different wavelengths, respectively. The primary pumping lights Li are incoherent pumping lights belonging to a first wavelength band (for example, the 1450 nm (nanometers) band). Thus, each of the i-pumps 101 may be called an incoherent light source.

The c-pumps 102 output secondary pumping lights Lc having different wavelengths, respectively. The secondary pumping lights Lc are coherent pumping lights belonging to a second wavelength band (for example, the 1350 nm band). Therefore, each of the c-pumps 102 may be called a coherent light source. As seen from the above, the second wavelength band is a wavelength band that is different from the first wavelength band and is narrower than the first wavelength band. The c-pumps 102 are only required to include a fiber bragg grating-laser diode (FBG-LD), a distributed feed-back (DFB)-LD, a distributed bragg reflector (DBR)-LD, a fabry-perot (FP)-LD, or any combination thereof.

The primary pumping lights Li amplify a signal light Ls in a third wavelength band that is different from both the first wavelength band and the second wavelength band. The third wavelength band is, for example, the C band, which is the 1550 nm band, or the L band, which is the 1600 nm band. The secondary pumping lights Lc amplify the primary pumping lights Li. The primary pumping lights Li and the secondary pumping lights Lc propagate in the same direction as the propagation direction of the signal light Ls.

Although the details will be described later, the primary pumping light Li has noise characteristics that the primary pumping light Li contains a relatively small RIN compared with that of the secondary pumping light Lc. The RIN is a parameter indicating the temporal fluctuation (intensity noise) in the intensity of laser light, and is obtained by dividing the fluctuation (noise) in light intensity per unit frequency by average optical power. When the signal light Ls, the primary pumping lights Li, and the secondary pumping lights Lc propagate together through the optical transmission line 31 over a long distance, the RINs of the primary pumping lights Li and the secondary pumping lights Lc are gradually transferred as noise to the signal light Ls. That is, the RIN transfer occurs. When the RIN transfer occurs, transmission errors due to the RIN increases, and thereby, the transmission performance of the transmission device 10 deteriorates. More specifically, the transmission distance of the transmission device 10 decreases. The present embodiment effectively controls the gain for the signal light Ls to reduce the RIN transferred to the signal light Ls and reduce the deterioration in transmission performance.

The forward first driver 103 is a drive circuit that controls the drive of the i-pump 101. The forward first driver 103 controls the power of the primary pumping light Li output by the i-pump 101 on the basis of a first control signal output from the tilt control unit 105T. The forward second driver 104 is a drive circuit that controls the drive of the c-pump 102. The forward second driver 104 controls the power of the secondary pumping light Lc output by the c-pump 102 on the basis of a second control signal output from the gain control unit 105G.

The forward control unit 105 controls the operations of the forward first drivers 103 and the forward second drivers 104. In particular, the tilt control unit 105T controls the operations of the forward first drivers 103 by outputting the first control signal. The tilt control unit 105T adjusts the ratio of power between the wavelengths of the primary pumping lights Li output from the i-pumps 101 by controlling the operations of the forward first drivers 103. In addition, the gain control unit 105G controls the operations of the forward second drivers 104 by outputting the second control signal. The gain control unit 105G adjusts the average power of the secondary pumping lights Lc output from the c-pumps 102 by controlling the operations of the forward second drivers 104. The forward control unit 105 includes a hardware circuit such as, for example, a memory and a central processing unit (CPU). The forward control unit 105 may be a hardware circuit such as an application specified integrated circuit (ASIC) or a field programmable gate array (FPGA) instead of the CPU.

The primary pumping lights Li output from the respective i-pumps 101 are input to the optical filter 106. The optical filter 106 guides the input primary pumping lights Li to the optical filter 108. The secondary pumping lights Lc output from the respective c-pumps 102 are input to the optical filter 107. The optical filter 107 guides the input secondary pumping lights Lc to the optical filter 108. The primary pumping lights Li output from the optical filter 106 and the secondary pumping lights Lc output from the optical filter 107 are input to the optical filter 108. The optical filter 108 guides the input primary pumping lights Li and the input secondary pumping lights Lc to the optical filter 109 via the opto-isolator 111.

The optical filter 109 guides the primary pumping lights Li and the secondary pumping lights Lc that have been input from the optical filter 108, to the optical transmission line 31. When the primary pumping lights Li and the secondary pumping lights Lc are guided to the optical transmission line 31, the lump loss of the optical transmission line 31 occurs. The gain control unit 105G can determine the lump loss by calculating, for example, the ratio between the power of the secondary pumping light Lc immediately before the input to the optical filter 109 and the power of the secondary pumping light Lc immediately after the output from the optical filter 109. The optical filter 109 removes the signal light Ls input from the optical filter 110 without allowing it to be input from the optical transmission line 31 to the optical filter 108. The optical filter 109 guides the signal light Ls together with the primary pumping lights Li and the secondary pumping lights Lc to the counter-propagating Raman amplifier 200 via the optical transmission line 31.

The OSC communication device 112 includes a small form-factor pluggable (SFP) transceiver. The OSC communication device 112 uses optical supervisory channel (OSC) light Lx to transmit the request of the forward control unit 105 and information to the OSC communication device 215 of the counter-propagating Raman amplifier 200. The OSC light Lx transmitted by the OSC communication device 112 is input to the optical filter 110. The optical filter 110 guides the input OSC light Lx to the optical filter 109. The optical filter 110 removes the signal light Ls without allowing the signal light Ls to be input from the optical transmission line 31 to the OSC communication device 112.

In addition, the OSC communication device 112 uses OSC light Ly to receive the request of the forward control unit (not illustrated) of the co-propagating Raman amplifier 250 and information. The OSC light Ly is output from the OSC communication device (not illustrated) of the co-propagating Raman amplifier 250. The OSC light Ly is input from an optical filter 155 of the counter-propagating Raman amplifier 150 to the OSC communication device 112. In the present embodiment, although the optical filter 155 is provided in the counter-propagating Raman amplifier 150, the optical filter 155 may be provided in the optical amplifier 16 (see FIG. 1). Similarly, in the present embodiment, although optical filters 156 and 157 are provided in the counter-propagating Raman amplifier 150, the optical filters 156 and 157 may be provided in the optical amplifier 16 (see FIG. 1). The optical filter 158 of the counter-propagating Raman amplifier 150 is coupled to the OSC communication device of the counter-propagating Raman amplifier 150, but the illustration of the OSC communication device is omitted in FIG. 2 and FIG. 3 described later because of space limitations. The optical filter 158 guides the OSC light Ly to the OSC communication device of the counter-propagating Raman amplifier 150.

The C-mPD 113 includes a photo diode (PD) that monitors (measures) the power of the signal light Lt in the C band. The C-mPD 113 detects the power of the signal light Lt in the C band that is output from the co-propagating Raman amplifier 250 and is input to the counter-propagating Raman amplifier 150. The signal light Lt in the C band is input from the optical filter 156 to the C-mPD 113. The tilt control unit 105T of the forward control unit 105 obtains the power of the signal light Lt in the C band from the output signal of the C-mPD 113.

The L-mPD 114 includes a PD that monitors the power of the signal light Lt in the L band. The L-mPD 114 detects the power of the signal light Lt in the L band that is output from the co-propagating Raman amplifier 250 and is input to the counter-propagating Raman amplifier 150. The signal light Lt in the L band is input to the L-mPD 114 from the optical filter 157. The tilt control unit 105T of the forward control unit 105 obtains the power of the signal light Lt in the L band from the output signal of the L-mPD 114.

The tilt control unit 105T performs tilt control for reducing the gain tilt that occurs between the C and L bands of the signal lights Ls, on the basis of the power of the signal light Lt in the C band, the power of the signal light Lt in the L band, and information contained in the OSC light Ly received by the OSC communication device 112. The gain tilt means a variation in wavelength characteristics of the gain when the gain provided to the signal light Ls varies. For example, the tilt control unit 105T performs the tilt control for reducing the tilt by adjusting the ratio of power between the wavelengths of the primary pumping lights Li. To adjust the ratio of power between the wavelengths of the primary pumping lights Li, the tilt control unit 105T performs the tilt control for the forward first drivers 103. The details of the tilt control will be described later.

The gain control unit 105G performs gain control for reducing a decrease in gain on the basis of the lump loss of the optical transmission line 31. For example, the gain control unit 105G performs the tilt control for reducing the average gain by adjusting the average power of the secondary pumping lights Lc. To adjust the average power of the secondary pumping lights Lc, the gain control unit 105G performs the gain control for the forward second drivers 104. The details of the gain control will be described later.

Next, a description will be given of the counter-propagating Raman amplifier 200. The counter-propagating Raman amplifier 200 includes a plurality of FBG-LDs (abbreviated as LD in FIG. 2) 201. The FBG-LD 201 is an example of a third light source. The counter-propagating Raman amplifier 200 also includes backward drivers 203 and a backward control unit 205. The backward control unit 205 includes a tilt control unit 205T and a gain control unit 205G. The counter-propagating Raman amplifier 200 further includes optical filters 206, 207, 208, 209, 210, and 212 and an opto-isolator 211. In addition, the counter-propagating Raman amplifier 200 includes an OSC communication device 215, a C-mPD 213, an L-mPD 214, and optical filters 255, 256, 257, and 258. The backward control unit 205 basically has the same hardware configuration as the forward control unit 105. The optical filters 255, 256, 257, and 258 correspond to the optical filters 155, 156, 157, and 158 described above, respectively. Therefore, for example, the optical filter 255 guides the OSC light Lx to the OSC communication device (not illustrated) of the co-propagating Raman amplifier 250. For example, the optical filter 258 guides the OSC light Lx to the OSC communication device 215 of the counter-propagating Raman amplifier 200. The illustration of the OSC communication device of the co-propagating Raman amplifier 250 is omitted because of space limitations.

The FBG-LDs 201 output primary pumping lights Lp having different wavelengths, respectively. The primary pumping lights Lp are coherent pumping lights belonging to the first wavelength band described above. Since the primary pumping lights Lp are coherent pumping lights, the primary pumping lights Lp differ from the primary pumping lights Li that are incoherent. As seen from the above, the primary pumping light Lp is another pumping light different from the primary pumping light Li. The primary pumping lights Lp amplify the signal light Ls. The primary pumping lights Lp propagate in a direction opposite to the propagation direction of the signal light Ls.

The backward driver 203 is a drive circuit that controls the drive of the FBG-LD 201. The backward driver 203 controls the power of the primary pumping light Lp output by the FBG-LD 201 on the basis of a third control signal output from the tilt control unit 205T. The backward driver 203 also controls the power of the primary pumping light Lp output by the FBG-LD 201 on the basis of a fourth control signal output from the gain control unit 205G.

The backward control unit 205 controls the operations of the backward drivers 203. In particular, the tilt control unit 205T controls the operations of the backward drivers 203 by outputting the third control signal. The gain control unit 205G controls the operations of the backward drivers 203 by outputting the fourth control signal. The tilt control unit 205T and the gain control unit 205G adjust the power of the primary pumping lights Lp output by the FBG-LDs 201 by controlling the operations of the backward drivers 203.

The primary pumping lights Lp output from some of the FBG-LDs 201 are input to the optical filter 206. The primary pumping lights Lp output from the rest of the FBG-LDs 201 are input to the optical filter 207. Both the optical filters 206 and 207 guide the input primary pumping lights Lp to the optical filter 208. The primary pumping lights Lp output from the optical filters 206 and 207 are input to the optical filter 208. The optical filter 208 guides the input primary pumping lights Lp to the optical filter 209 via the opto-isolator 211.

The optical filter 209 guides the primary pumping lights Lp input from the optical filter 208 to the optical transmission line 31. When the primary pumping lights Lp are guided to the optical transmission line 31, a lump loss occurs. The gain control unit 205G can determine the lump loss of the optical transmission line 31 by calculating the ratio between the power of the primary pumping light Lp immediately before the input to the optical filter 209 and the power of the primary pumping light Lp immediately after the output from the optical filter 209, for example. The optical filter 209 removes the signal light Ls input from the co-propagating Raman amplifier 100 to the counter-propagating Raman amplifier 200 without allowing it to be input from the optical transmission line 31 to the optical filter 208. The optical filter 209 guides the signal light Ls to the optical filter 210 via the optical transmission line 31.

The C-mPD 213 includes a PD that monitors the power of the signal light Ls in the C band. The C-mPD 213 detects the power of the signal light Ls in the C band that is output from the co-propagating Raman amplifier 100 and is input to the counter-propagating Raman amplifier 200. The signal light Ls in the C band is input from the optical filter 210 to the C-mPD 213. The tilt control unit 205T of the backward control unit 205 obtains the power of the signal light Ls in the C band from the output signal of the C-mPD 213.

The L-mPD 214 includes a PD that monitors the power of the signal light Ls in the L band. The L-mPD 214 detects the power of the signal light Ls in the L band that is output from the co-propagating Raman amplifier 100 and is input to the counter-propagating Raman amplifier 200. The signal light Ls in the L band is input from the optical filter 212 to the L-mPD 214. The tilt control unit 205T of the backward control unit 205 obtains the power of the signal light Ls in the L band from the output signal of the L-mPD 214.

The tilt control unit 205T performs tilt control for reducing the gain tilt that occurs between the C and L bands of the signal lights Ls, on the basis of the power of the signal light Ls in the C band, the power of the signal light Ls in the L band, information contained in the OSC light Lx received by the OSC communication device 215, and the like. For example, the tilt control unit 205T performs the tilt control for reducing the tilt by adjusting the ratio of power between the wavelengths of the primary pumping lights Lp. Therefore, the tilt control unit 205T performs the tilt control for the backward drivers 203.

The gain control unit 205G performs gain control for reducing a decrease in gain, on the basis of the lump loss of the optical transmission line 31. For example, the gain control unit 205G performs the gain control for reducing the average gain by adjusting the average power of the primary pumping lights Lp. Therefore, the gain control unit 205G performs the gain control for the backward drivers 203 in the same manner as the tilt control unit 205T.

With reference to FIG. 3, a Raman amplification system STb in accordance with a comparative example will be described in comparison with the Raman amplification system STa in accordance with the embodiment. In FIG. 3, the same components as those of the Raman amplification system STa described with reference to FIG. 2 are provided with the same reference numerals as those in FIG. 2, and the detailed description thereof is omitted.

As illustrated in FIG. 3, in the Raman amplification system STb in accordance with the comparative example, as in the embodiment, the tilt control unit 105T controls the operations of the forward first drivers 103 by outputting the first control signal. The tilt control unit 105T adjusts the ratio of power between the wavelengths of the primary pumping lights Li output from the i-pumps 101 by controlling the operations of the forward first drivers 103. On the other hand, in the Raman amplification system STb in accordance with the comparative example, unlike the embodiment, the gain control unit 105G controls the operations of the forward first drivers 103 by outputting the second control signal. The gain control unit 105G adjusts the average power of the primary pumping lights Li output by the i-pumps 101 by controlling the operations of the forward first drivers 103.

As described above, the control target of the tilt control unit 105T is the same between the embodiment and the comparative example, but the control target of the gain control unit 105G differs between the embodiment and the comparative example. That is, the gain control unit 105G in accordance with the embodiment controls the operations of the forward second drivers 104 by outputting the second control signal. The gain control unit 105G in accordance with the comparative example controls the operations of the forward first drivers 103 by outputting the second control signal. The difference in effects and advantages based on the difference between the control targets will be described later.

Next, a description will be given of the operation of the forward control unit 105 with reference to FIG. 4 to FIG. 7.

Figure 4:
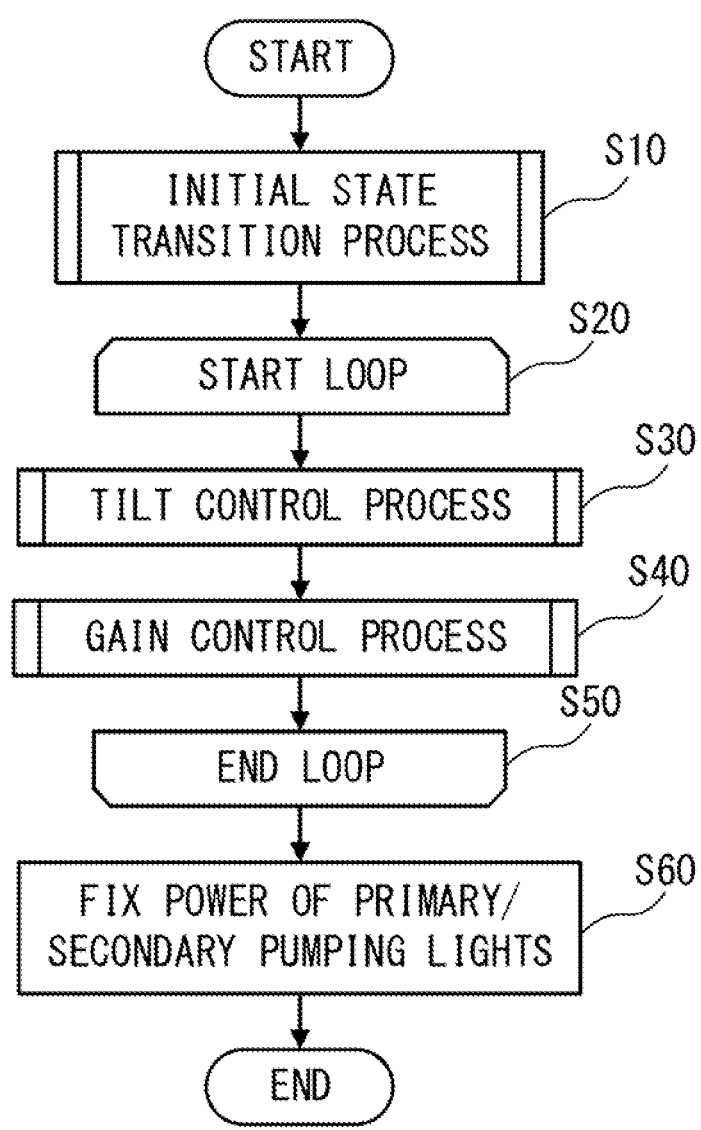
FIG. 4 is a flowchart illustrating the operation of a forward control unit.
Figure 5:
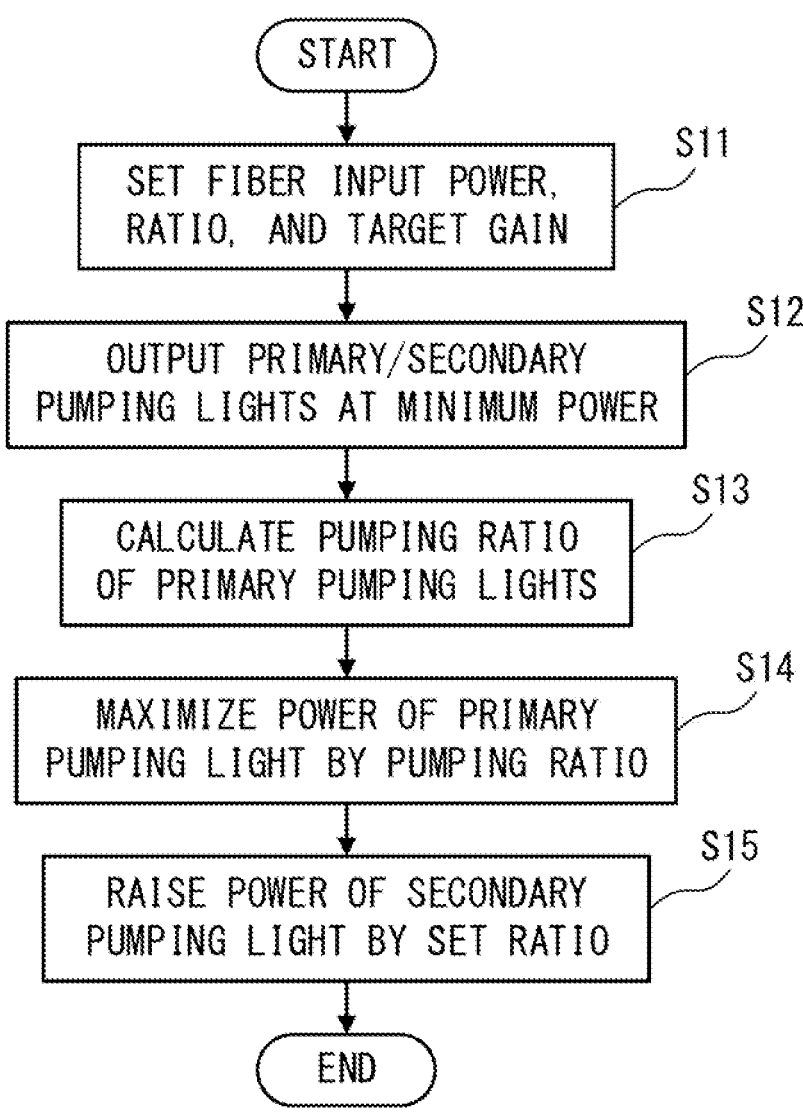
FIG. 5 is a flowchart of an example of an initial state transition process.

As illustrated in FIG. 4, the forward control unit 105 first executes an initial state transition process (step S10). The initial state transition process is a process of raising the power of the primary pumping lights Li and the power of the secondary pumping lights Lc from the minimum power to the power of the initial state. More specifically, when the forward control unit 105 starts executing the initial state transition process, as illustrated in FIG. 5, the forward control unit 105 sets fiber input power, a predetermined ratio, and a target gain for the co-propagating Raman amplifier 100 (step S11). The fiber input power is the power of the signal light Ls that is output from the transmission device 10 to the optical transmission line 31 and is input to the optical transmission line 31. The predetermined ratio is the ratio by which the power of the secondary pumping light Lc is raised.

The fiber input power and the target gain are set on the basis of the transmission line types of the optical transmission lines 31 and 32. For example, the forward control unit 105 includes a table that stores a correspondence relationship between the transmission line type and the fiber input power in advance, and when the transmission line type is specified, the forward control unit 105 refers to this table to set the fiber input power corresponding to the specified transmission line type. In addition, the forward control unit 105 includes a table that stores a correspondence relationship between the transmission line type and the target gain in advance, and when the transmission line type is specified, the forward control unit 105 refers to this table to set the target gain corresponding to the specified transmission line type. For the power of the secondary pumping light Lc, the predetermined ratio specified in advance is set.

When the process in step S11 is completed, the forward control unit 105 turns on the primary pumping lights Li and the secondary pumping lights Lc at the minimum power (step S12). That is, the forward control unit 105 performs control for causing the i-pumps 101 to output the primary pumping lights Li with the minimum power, for the forward first drivers 103. The forward control unit 105 also performs control for causing the c-pumps 102 to output the secondary pumping lights Lc with the minimum power, for the forward second drivers 104.

When the process in step S12 is completed, the forward control unit 105 calculates the pumping ratio of the primary pumping lights Li (step S13). For example, the forward control unit 105 calculates the pumping ratio of the primary pumping lights Li on the basis of the total input power obtained by multiplying the fiber input power by the number of bands (or the number of wavelengths) of the signal light Ls, and the target gain.

When the process in step S13 is completed, the forward control unit 105 maximizes the power of the primary pumping lights Li by the pumping ratio (step S14). Since the primary pumping lights Li are output at the minimum power, by maximizing the primary pumping lights Li by the pumping ratio, the primary pumping lights Li are output at the power according to the pumping ratio (for example, several fold). When the process in step S14 is completed, the forward control unit 105 raises the power of the secondary pumping lights Lc by the set predetermined ratio (step S15). When the process in step S15 is completed, the forward control unit 105 finishes the initial state transition process.

The completion of the initial state transition process allows the power characteristics of the primary pumping lights Li in the initial state and the power characteristics of the secondary pumping lights Lc in the initial state to be determined, as illustrated in FIG. 6A. FIG. 6A illustrates three primary pumping lights Li having different wavelengths and five secondary pumping lights Lc having different wavelengths as examples, but the number of wavelengths is not particularly limited. The number of wavelengths of the primary pumping lights Li may be the same as or different from the number of wavelengths of the secondary pumping lights Lc.

The setting of the target gain in the process in step S11 causes the gain to be changed, causing the gain tilt between the C band and the L band as illustrated in FIG. 6A. In FIG. 6A, the signal light Ls in the C band including several tens of wavelengths and the signal light Ls in the L band including several tens of wavelengths are illustrated, but the number of wavelengths is not particularly limited, and the number of wavelengths may be the same or may differ between the C band and the L band. As seen from the above, since the gain tilt occurs between the C band and the L band, as illustrated in FIG. 4, the forward control unit 105 starts a loop process (step S20), and first, the tilt control unit 105T performs a tilt control process (step S30).

Figures 7A, 7B:
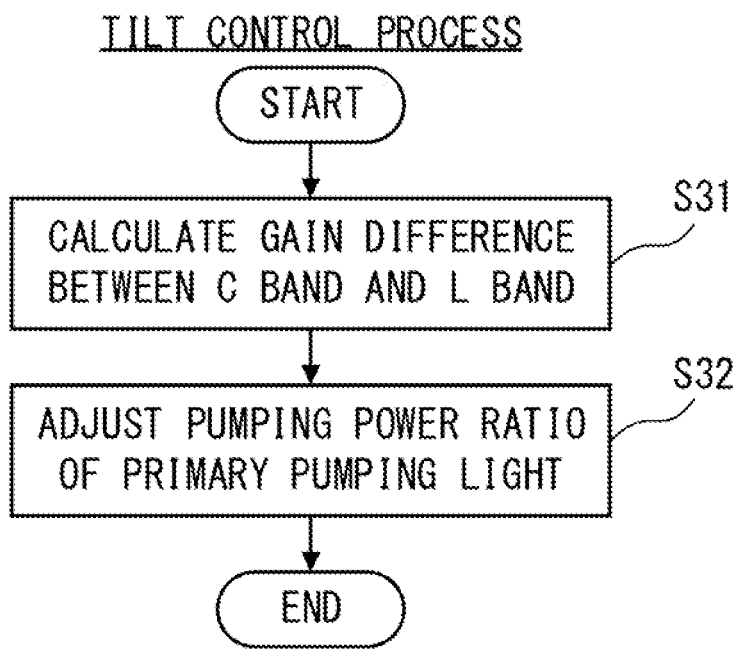
FIG. 7A is a flowchart of an example of a tilt control process.
FIG. 7B is a flowchart of an example of a gain control process.

More specifically, as illustrated in FIG. 7A, the tilt control unit 105T calculates the gain difference between the C band and the L band (step S31). For example, the tilt control unit 105T calculates a first gain of the signal light Lt of each wavelength belonging to the C band by the Raman amplification in the optical transmission line 32, on the basis of the power of the signal light Lt in the C band and the information indicating the output power of the signal light Lt in the C band contained in the OSC light Ly. Similarly, the tilt control unit 105T calculates a second gain of the signal light Lt in the L band by the Raman amplification in the optical transmission line 32, on the basis of the power of the signal light Lt in the L band and information indicating the output power of the signal light Lt belonging to the L band contained in the OSC light Ly. After calculating the first gain and the second gain, the tilt control unit 105T calculates the gain difference between the C band and the L band, on the basis of the difference between the first gain and the second gain. Therefore, in the gain characteristics illustrated in FIG. 6A, the gain difference between the gain of the L band, which is the wavelength band with high gain, and the gain of the C band, which is the wavelength band with a low gain, is calculated.

After calculating the gain difference, the tilt control unit 105T adjusts the pumping power ratios of the primary pumping lights Li, on the basis of the gain difference (step S32). Here, the tilt control unit 105T includes a pumping ratio table that stores ratio information indicating the pumping power ratios of the primary pumping lights Li for obtaining the specified gain characteristics with respect to the gain by the Raman amplification in the optical transmission line 32. Therefore, the tilt control unit 105T adjusts the pumping power ratios of the primary pumping lights Li on the basis of the gain difference and the ratio information of the pumping ratio table, and determines whether the gain difference becomes within an acceptable range. When the gain difference becomes within the acceptable range, the tilt control unit 105T finishes the tilt control process.

For example, as illustrated in FIG. 6B, when the ratio of power of the primary pumping light Li between the wavelengths is adjusted on the basis of the gain difference and the ratio information, the gain of the C band increases, and the gain of the L band decreases. This causes the gain characteristics to be substantially uniform or substantially flat. In this case, the tilt control unit 105T determines that the gain difference becomes within the acceptable range, and finishes the tilt control process.

When the tilt control unit 105T finishes the tilt control process, as illustrated in FIG. 4, the gain control unit 105G performs a gain control process (step S40). More specifically, as illustrated in FIG. 7B, the gain control unit 105G calculates the average gain of the entirety of the C band and the L band (step S41). For example, the gain control unit 105G sums up the first gain of the signal light Lt in the C band and the second gain of the signal light Lt in the L band, and divides the resulting sum by the number of bands of the C band and the L band to calculate the average gain. The gain control unit 105G may calculate the average gain by summing up the first gains of the signal lights Lt of respective wavelengths belonging to the C band and the second gains of the signal lights Lt of respective wavelengths belonging to the L band and dividing the resulting sum by the total number of wavelengths included in the C band and the L band.

After calculating the average gain, the gain control unit 105G adjusts the average power of the secondary pumping lights Lc (step S42). For example, the gain control unit 105G determines the lump loss by calculating the ratio between the power of the secondary pumping light Lc immediately before the input to the optical filter 109 and the power of the secondary pumping light Lc immediately after the output from the optical filter 109. Then, the gain control unit 105G adjusts the average power of the secondary pumping lights Lc up and down on the basis of the determined lump loss until the target gain is achieved.

As illustrated in FIG. 6C, when the average power of the secondary pumping lights Lc is adjusted to be decreased, the gain of the C band and the gain of the L band decrease. As the average power of the secondary pumping lights Lc decreases, the amount of noise of the RINs of the secondary pumping lights Lc decreases. This can reduce the amount of noise of the RINs of the secondary pumping lights Lc transferred to the signal light Ls via the primary pumping lights Li. After adjusting the average power of the secondary pumping lights Lc, the gain control unit 105G finishes the gain control process.

When the gain control process is finished, as illustrated in FIG. 4, the forward control unit 105 finishes the loop process (step S50). For example, when both the gain difference and the average gain are within respective acceptable ranges, the forward control unit 105 finishes the loop process, fixes the power of each of the primary pumping lights Li and the power of each of the secondary pumping lights Lc (step S60), and finishes the process. On the other hand, when at least the gain difference or the average gain is not within the acceptable range, the forward control unit 105 returns to the process in step S20, and the tilt control unit 105T and the gain control unit 105G repeat the same processes.

Next, a description will be given of the tilt control and the gain control in accordance with the comparative example with reference to FIG. 8 and FIG. 9. The initial state illustrated in FIG. 8A is the same as the initial state illustrated in FIG. 6A, and therefore, the detailed description thereof is omitted. The tilt control illustrated in FIG. 8B is also the same as the tilt control illustrated in FIG. 6B, and therefore, the detailed description thereof is omitted.

As illustrated in FIG. 8C, the gain control unit 105G in accordance with the comparative example performs the gain control process for the primary pumping lights Li. As described, even when the gain control unit 105G in accordance with the comparative example performs the gain control process for the primary pumping lights Li, the average gain can be controlled as in the embodiment. However, since the gain control unit 105G in accordance with the comparative example does not perform the gain control process for the secondary pumping lights Lc, the power of the secondary pumping light Lc remains fixed from the initial state. Therefore, the amount of noise of the RINs of the secondary pumping lights Lc does not vary. Therefore, compared with the case of the embodiment, the amount of noise of the RINs of the secondary pumping lights Lc transferred to the signal light Ls via the primary pumping lights Li cannot be reduced. In other words, the amount of noise of the RINs of the secondary pumping lights Lc transferred to the signal light Ls relatively increases as compared with that in the embodiment.

Figure 9A:
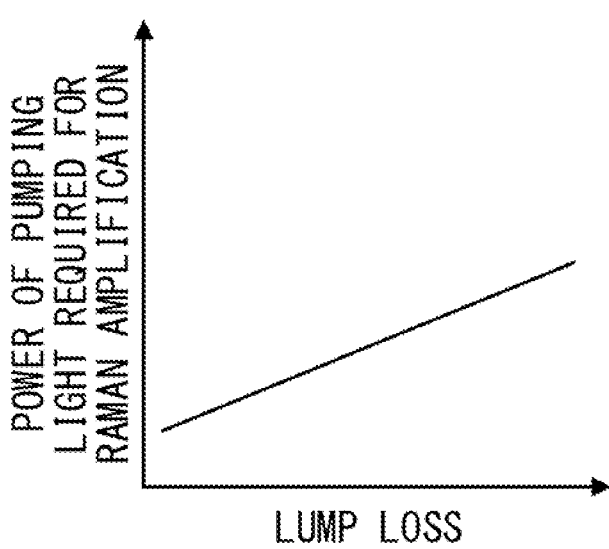
FIG. 9A is an example of a graph presenting a relationship between a lump loss and power of pumping light required for compensation of the lump loss.

When the lump loss is large as illustrated in FIG. 9A, to compensate the lump loss, it is required to increase the power of the pumping light of the Raman amplification. When the power of the pumping light of the Raman amplification is increased, it is conceivable to increase the power of the primary pumping lights Li, the power of the secondary pumping lights Lc, or both of them.

Figure 9B:
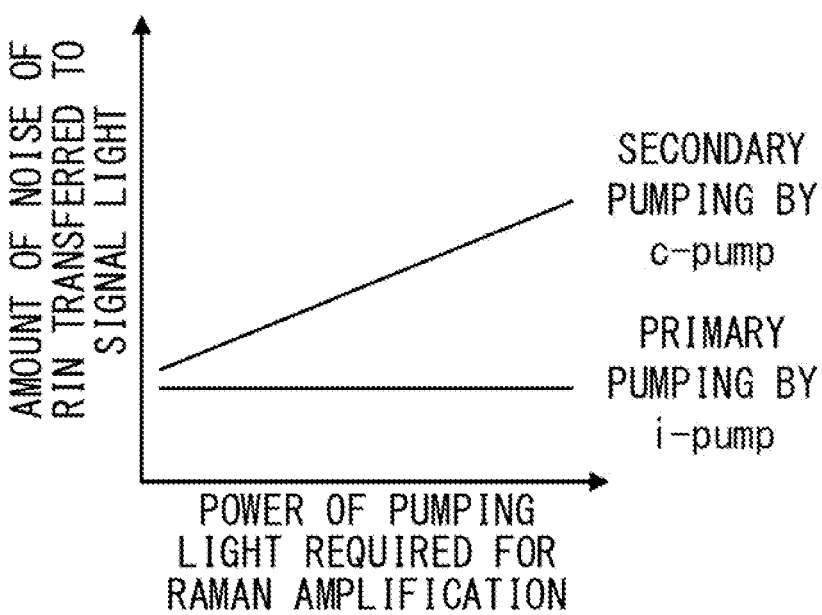
FIG. 9B is an example of a graph presenting noise characteristics of an i-pump and a c-pump.

As illustrated in FIG. 9B, even when the power of the primary pumping light Li output by the i-pump 101 increases, the amount of noise of the RIN of the primary pumping light Li is not proportional to the increase in power, and is substantially constant. That is, the amount of noise of the RIN of the primary pumping light is substantially constant regardless of the increase or decrease in power of the primary pumping light. By contrast, as the power of the secondary pumping light Lc output by the c-pump 102 increases, the amount of noise of the RIN increases in proportion to the increase in power. That is, the amount of noise of the RIN of the secondary pumping light varies according to the increase or decrease in the power of the secondary pumping light. In particular, in many cases, the amount of noise of the RIN of the secondary pumping light Lc is larger than that of the primary pumping light Li.

Therefore, to achieve the same average gain, as described as the comparative example, it is not desirable that both the tilt control and the gain control do not adjust the power of the secondary pumping lights Lc and adjust the power of the primary pumping lights Li alone. To achieve the same average gain, as described as the embodiment, it is desirable that the tilt control adjusts the power of the primary pumping light Li and the gain control adjusts the power of the secondary pumping light Lc. By adjusting the power of the secondary pumping light Lc, which contains the RIN having the larger amount of noise than that of the primary pumping light Li, the amount of noise of the RIN transferred to the signal light Ls can be reduced. As a result, the embodiment can improve the transmission performance such as the long transmission distance.

Figures 10A, 10B:
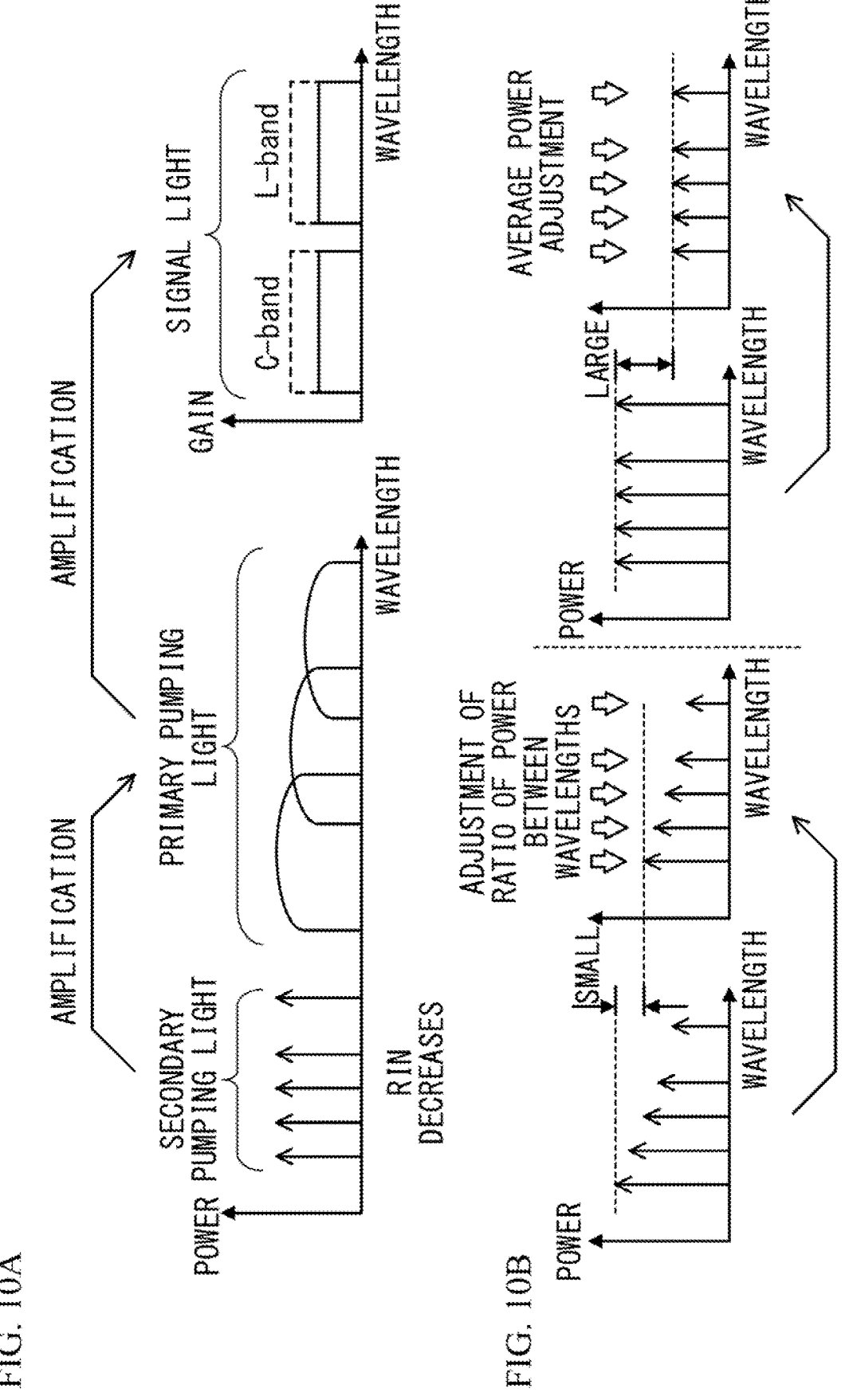
FIG. 10A is a diagram for describing an example of the amplification of the signal light.
FIG. 10B is a diagram for describing an example of a variable range of power of secondary pumping light.

For example, it may be conceivable to adjust the ratio of power between the wavelengths of the secondary pumping lights Lc in the tilt control. However, as illustrated in FIG. 10A, since the secondary pumping lights Lc amplify the signal light Ls via the primary pumping lights Li, the ratio of the gain for the signal light Ls is less likely to vary. As a result, the variable range of the ratio of gain between wavelengths narrows. As seen from the above, it is considered that the gain for the signal light Ls does not vary so much even when the ratio of power between the wavelengths of the secondary pumping lights Lc is adjusted.

In addition, as illustrated in the left part of FIG. 10B, when the ratio of power between the wavelengths of the secondary pumping lights Lc is adjusted, since there is a power difference between the wavelengths of the secondary pumping lights Lc, the variable range of the power of the secondary pumping light Lc becomes smaller by the power difference. Therefore, as illustrated in the right part of FIG. 10B, changing the average power without adjusting the ratio of power between the wavelengths of the secondary pumping lights Lc is advantageous in that the variable range of the power of the secondary pumping light Lc can be increased. Thus, it is extremely desirable that the tilt control adjusts the ratio of power between the wavelengths of the primary pumping lights Li, and the gain control adjusts the average power of the secondary pumping lights Lc.

As described above, the co-propagating Raman amplifier 100 in accordance with the present embodiment includes the i-pump 101, the c-pump 102, and the forward control unit 105. The i-pump 101 outputs the primary pumping light Li, which propagates in the same direction as the propagation direction of the signal light Ls, to the optical transmission line 31 for Raman amplification. The c-pump 102 outputs the secondary pumping light Lc, which amplifies the primary pumping light Li and propagates in the same direction as the propagation direction of the signal light Ls, to the optical transmission line 31. The forward control unit 105 controls the gain for the signal light Ls by adjusting the average power of the secondary pumping light Lc. These configurations allow the gain for the signal light Ls to be effectively controlled, and as a result, the transmission performance can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A Raman amplifier comprising:
   a first light source that outputs a primary pumping light for Raman amplification, which propagates in a same direction as a propagation direction of a signal light, to an optical transmission line;
   a second light source that outputs a secondary pumping light, which amplifies the primary pumping light and propagates in the same direction as the propagation direction, to the optical transmission line; and a control unit that controls a gain for the signal light by adjusting power of the secondary pumping light by a first ratio after maximizing power of the primary pumping light by a second ratio.

2. The Raman amplifier according to claim 1, wherein the first light source outputs an incoherent light as the primary pumping light, and the second light source outputs, as the secondary pumping light, a pumping light different from the incoherent light.

3. The Raman amplifier according to claim 1, wherein the second light source includes a fiber bragg grating (FBG) laser, a distributed feedback (DFB) laser, a distributed bragg reflector (DBR) laser, a Fabry-Perot laser, or any combination thereof.

4. The Raman amplifier according to claim 1, wherein the control unit controls the gain for the signal light by adjusting average power of the secondary pumping light up and down, based on a lump loss of the optical transmission line.

5. The Raman amplifier according to claim 1, wherein the secondary pumping light contains a larger noise than the primary pumping light.

6. The Raman amplifier according to claim 1, wherein a first noise of the primary pumping light is substantially constant regardless of an increase or decrease in power of the primary pumping light as compared to the secondary pumping light, a second noise of the secondary pumping light varies according to an increase or decrease in power of the secondary pumping light, and the first noise is smaller than the second noise.

7. The Raman amplifier according to claim 1, wherein the first ratio indicates a set predetermined ratio, and the second ratio indicates a pumping ratio.

8. A Raman amplification method comprising:

outputting a primary pumping light and a secondary pumping light for Raman amplification to an optical transmission line, the primary pumping light propagating in a same direction as a propagation direction of a signal light, the secondary pumping light amplifying the primary pumping light and propagating in the same direction as the propagation direction; and controlling a gain for the signal light by adjusting power of the secondary pumping light by a first ratio after maximizing power of the primary pumping light by a second ratio.

9. A Raman amplification system comprising:

a first Raman amplifier including:

a first light source that outputs a primary pumping light for Raman amplification, which propagates in a same direction as a propagation direction of a signal light, to an optical transmission line, a second light source that outputs a secondary pumping light, which amplifies the primary pumping light and propagates in the same direction as the propagation direction, to the optical transmission line, and a forward control unit that controls a gain for the signal light by adjusting power of the secondary pumping light by a first ratio after maximizing power of the primary pumping light by a second ratio; and a second Raman amplifier including:

a third light source that outputs another primary pumping light propagating in a direction opposite to the propagation direction, and a backward control unit that controls the gain for the signal light by adjusting power of the another primary pumping light.

* * * * *